E. E. CUNNINGHAM & H. L. WILSON.
AUTOMATIC AUTOMOBILE JACK.
APPLICATION FILED MAY 8, 1916.
1,212,329.
Patented Jan. 16, 1917.
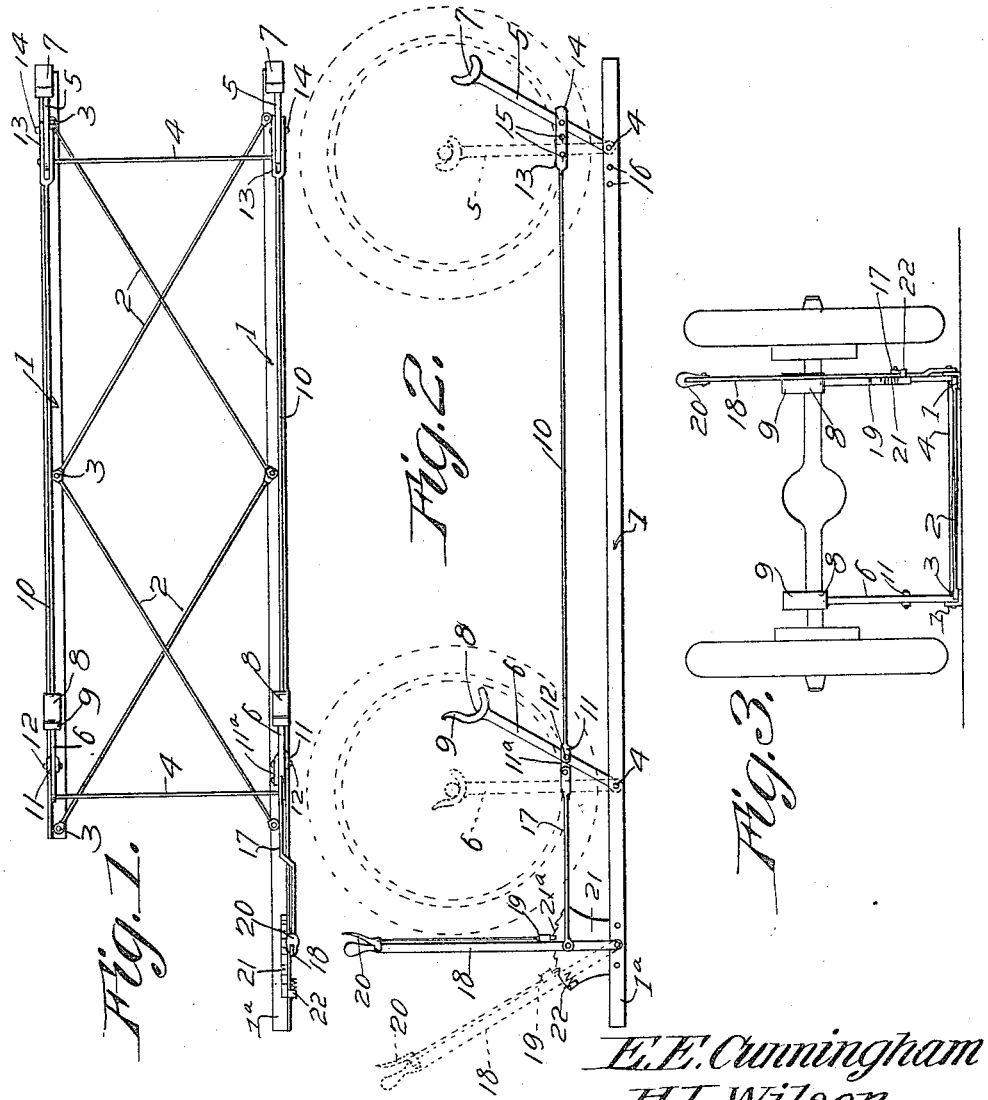
E. E. Cunningham
and H. L. Wilson,
Inventors
Witnesses
by C. A. Snow & Co.
Attorneys

UNITED STATES PATENT OFFICE.

EDWARD EELLS CUNNINGHAM AND HAZEN L. WILSON, OF ST. ALBANS, WEST VIRGINIA.

AUTOMATIC AUTOMOBILE-JACK.

1,212,329. Specification of Letters Patent. Patented Jan. 16, 1917.

Application filed May 8, 1916. Serial No. 96,132.

*To all whom it may concern:*

Be it known that we, EDWARD E. CUNNINGHAM and HAZEN L. WILSON, citizens of the United States, residing at St. Albans, in the county of Kanawha, State of West Virginia, have invented a new and useful Automatic Automobile-Jack, of which the following is a specification.

The present invention appertains to automobile jacks, and aims to provide a novel and improved device for elevating an automobile run onto the same, whereby to jack up the automobile to relieve the tires of the weight of the car, and to lengthen the lives thereof.

It is the object of the invention to provide an automobile jack so constructed that an automobile can readily be run onto and off the same, and can be effectively held in elevated position, the device being extremely simple and inexpensive in construction, and being thoroughly practical and efficacious in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a plan view of the improved jack. Fig. 2 is a side elevation thereof, illustrating in dotted lines the parts when in position to hold an automobile elevated. Fig. 3 is a rear end view of the device.

The frame or base of the jack embodies a pair of parallel longitudinal side sills 1, preferably composed of angle iron, having certain flanges projecting toward one another and the other flanges projecting upwardly. Crossed stays 2, formed from rods or other suitable stock, have their terminals riveted, bolted, or otherwise secured, as at 3, upon the first mentioned flanges of the sills 1, to render the frame rigid with a minimum number of parts. Mounted for rotation in the upwardly projecting flanges of the sills 1 near the opposite ends thereof are transverse rock shafts 4. A pair of jack arms 5 is mounted upon the forward rock shaft or rod 4 adjacent the sills 1, and a similar pair of arms 6 is mounted upon the rear shaft or rod 4 adjacent the sills. The upper ends of the arms 5 have curved seats 7 for the front axle of an automobile, and the upper ends of the arms 6 have similar seats 8 for the rear axle, said seats 8 having rear upwardly projecting extensions 9. The arms 5—6 at the opposite sides are connected by longitudinal links or rods 10 provided at their rear ends with forks 11 straddling and pivoted to, as at 12, the arms 6. The forward ends of the links 10 have forks 13 straddling the arms 5 and pivoted thereto by pins or other pivots 14. The forks 13 have series of apertures 15 for the reception of the pins 14, whereby the arms 5 can be adjusted longitudinally. For this same purpose, the upwardly projecting flanges of the sills 1 have series of apertures 16 for the reception of the forward rod 4, whereby the arms 5 can be moved relative to the arms 6 to adjust the jack for different automobiles having various wheel bases.

As a means for controlling the jack arms 5 and 6, a branch of one fork 11 is provided with an extension 11$^a$ to which is pivoted a link 17 having its other end pivoted to an upwardly projecting hand lever 18 fulcrumed to a rearwardly projecting extension 1$^a$ of the respective sill 1. The lever 18 carries a pawl or dog 19 operated by a handle member 20, and engageable with the ratchet teeth 21$^a$ of a quadrant or segment 21 attached to the extension 1$^a$ and projecting upwardly therefrom. The segment 21 carries a buffer 22 of any suitable sort against which the lever 18 is adapted to bear when the arms 5 and 6 are swung to vertical or perpendicular position.

Fig. 2 illustrates in full lines, the position of the parts when ready to receive an automobile. The arms 5 and 6 are inclined forwardly so that the axles of the automobile can pass over the seats 7 and 8 when the automobile is backed over the device. The pawl 19 in engaging one of the teeth 21$^a$ holds the lever 18 and arms 5—6 in proper position, and when the rear axle moves over the seats 8, it strikes the extensions 9, whereby swinging the arms 6 rearwardly so that the rear axle seats upon the seats 8. At the same time, the forward arms 5 are swung rearwardly under the front axle which seats upon the seats 7, and the momentum of the car will swing the jack arms to vertical or perpendicular position, whereby the car is elevated to raise the tires thereof from the floor for the intended purpose. When the jack arms are swung rearwardly, the lever 18 is moved likewise, and its pawl 19 in engaging the ratchet teeth 21$^a$ will prevent the forward movement of the parts when the automobile is jacked up, which action can take place automatically as above indicated. By releasing the pawl 19, the lever 18 can be released, so that the jack arms can swing forwardly to let the machine onto the floor carefully, and it can start off at once. It is possible that the handle member 20 and lever 18 can be operated from the machine, whereby a person in the car can let it down, before or after the engine is started, whereby a getaway can be made without trouble. The jack, when the automobile is lowered and moved away, is in position to again receive the automobile without the necessity of again setting or manipulating the jack.

The present device is extremely simple in construction, using little material, and being light in weight, and easy to move about. The structure, nevertheless, is solid or rigid in construction, and is assembled and built as a complete unit. There are few parts to wear or become loose. The jack also provides sufficient clear space under the automobile when it is jacked up, for making repairs from below. It is preferable to line the seats 7 and 8 with rubber or other compressible material to prevent the marring of the enamel or other finish of the axles.

Having thus described the invention, what is claimed as new is:

An automobile jack embodying a base including parallel longitudinal side sills of angle iron having certain flanges projecting toward one another and other flanges projecting upwardly and stays attached to the first mentioned flanges, transverse rock shafts mounted in the second mentioned flanges adjacent the ends of the sills, a pair of jack arms mounted upon each shaft adjacent the sills and projecting upwardly, said arms having axle seats at their upper ends, the seats of the rear arms having extensions for the engagement of one axle of an automobile, links having forks at their ends straddling and pivoted to the arms at the opposite sides, one of the sills having an extension, an upwardly projecting segment carried by said extension having ratchet teeth, an upwardly projecting hand lever fulcrumed to said extension and having a pawl engageable with said segment, and a link connecting said lever and one of said forks.

In testimony that we claim the foregoing as our own, we have hereto affixed our signatures in the presence of two witnesses.

EDWARD EELLS CUNNINGHAM.
HAZEN L. WILSON.

Witnesses:
A. W. WHEATON,
W. S. DAVIS.

Copies of this patent may be obtained for five cents each, by addressing the "Commissioner of Patents Washington, D. C."